United States Patent
Beauregard

(10) Patent No.: US 9,100,278 B2
(45) Date of Patent: Aug. 4, 2015

(54) OFDM SPEED ESTIMATION

(71) Applicant: QUALCOMM Incorporated, San Diego, CA (US)

(72) Inventor: Stephen J. Beauregard, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 51 days.

(21) Appl. No.: 13/782,888

(22) Filed: Mar. 1, 2013

(65) Prior Publication Data

US 2014/0050257 A1  Feb. 20, 2014

Related U.S. Application Data

(60) Provisional application No. 61/684,661, filed on Aug. 17, 2012.

(51) Int. Cl.
| | |
|---|---|
| H04L 12/26 | (2006.01) |
| H04W 64/00 | (2009.01) |
| G01S 5/02 | (2010.01) |
| G01S 11/10 | (2006.01) |
| H04L 27/26 | (2006.01) |

(52) U.S. Cl.
CPC ............. *H04L 43/00* (2013.01); *G01S 5/0257* (2013.01); *G01S 11/10* (2013.01); *H04W 64/006* (2013.01); *H04L 27/2647* (2013.01)

(58) Field of Classification Search
CPC ............ H04L 27/2647; H04L 27/265; H04W 64/006; G01S 11/10
USPC .......................... 342/104, 111, 112, 116, 461
See application file for complete search history.

(56) References Cited

U.S. PATENT DOCUMENTS

| | | | | |
|---|---|---|---|---|
| 5,526,426 | A * | 6/1996 | McLaughlin | ............ 379/406.13 |
| 7,386,072 | B2 | 6/2008 | Uno | |
| 7,511,662 | B2 | 3/2009 | Mathews et al. | |
| 7,619,964 | B2 | 11/2009 | Son et al. | |
| 7,817,738 | B2 | 10/2010 | Takeuchi et al. | |
| 7,916,074 | B2 | 3/2011 | Mathews et al. | |
| 8,081,105 | B2 * | 12/2011 | Tigrek et al. | ................... 342/105 |
| 8,314,736 | B2 | 11/2012 | Moshfeghi | |
| 8,737,543 | B2 * | 5/2014 | Park et al. | ...................... 375/343 |

(Continued)

FOREIGN PATENT DOCUMENTS

| | | |
|---|---|---|
| CN | 102025680 A | 4/2011 |
| JP | 2012063152 A | 3/2012 |

OTHER PUBLICATIONS

Mathews, et al., "SCP Enabled Navigation Using Signals of Opportunity in GPS Obstructed Environments," Journal of the Institute of Navigation, vol. 58, No. 2, Summer 2011, pp. 91-110.
International Search Report and Written Opinion—PCT/US2013/054745—ISA/EPO—Nov. 4, 2013.

(Continued)

*Primary Examiner* — Sophia Vlahos
(74) *Attorney, Agent, or Firm* — Kilpatrick Townsend & Stockton LLP

(57) ABSTRACT

Techniques are provided for deriving speed estimates by performing a convolution of the output of the Fast Fourier Transform (FFT) stage from different time windows in an orthogonal frequency-division multiplexing (OFDM) modulation scheme. Such techniques enable speed estimation to be performed in the frequency domain, requiring little or no modification to existing OFDM systems.

24 Claims, 5 Drawing Sheets

(56) References Cited

U.S. PATENT DOCUMENTS

| | | |
|---|---|---|
| 2005/0060094 A1 | 3/2005 | Lee et al. |
| 2008/0107200 A1* | 5/2008 | Zhu et al. .................. 375/260 |
| 2010/0158163 A1 | 6/2010 | Wu et al. |
| 2010/0309051 A1* | 12/2010 | Moshfeghi .................. 342/378 |
| 2012/0086606 A1 | 4/2012 | Mathews et al. |

OTHER PUBLICATIONS

Yanqin, Z., et al., "Application of two-dimensional time-domain correlation method to stepped-frequency radar motion compensation", Synthetic Aperture Radar, 2009. APSAR 2009. 2nd AS I AN—Pacific Conference on, IEEE, Piscataway, NJ, USA, Oct. 26, 2009, pp. 412-416, XP031596317, ISBN: 978-1-4244-2731-4 p. 415, section 3.5.

* cited by examiner

OFDM SPEED ESTIMATION

CROSS-REFERENCES TO RELATED APPLICATIONS

This application claims the benefit of U.S. Provisional Application No. 61/684,661, entitled "OFDM SPEED ESTIMATION METHOD," filed Aug. 17, 2012, which is assigned to the assignee hereof and expressly incorporated by reference herein.

BACKGROUND

For many applications and in many contexts, it can be desirable to know the absolute speed of a person or vehicle. For instance, a pedestrian or a driver may simply want to know how fast they are moving (i.e., a speedometer). For 2D and/or 3D positioning purposes, it can be advantageous to fuse an absolute speed measurement with information from other position- or motion-dependent sensors. For instance, absolute speed measurements can be used to bound position drift in an inertial navigation system (INS).

Orthogonal frequency-division multiplexing (OFDM) modulation schemes are currently utilized in a large number of broadcast and 2-way radio frequency (RF) communication systems. Therefore, it can be beneficial to exploit OFDM for the purpose of speed estimation. However, current techniques of doing so can be difficult to implement due to the computational and memory requirements.

SUMMARY

Embodiments of the present invention are directed toward deriving speed estimates by performing a convolution of the output of the Fast Fourier Transform (FFT) stage from different time windows in an orthogonal frequency-division multiplexing (OFDM) modulation scheme. Such techniques enable speed estimation to be performed in the frequency domain, requiring little or no modification to existing OFDM systems.

An example method for estimating speed using an OFDM receiver, according to the disclosure, includes receiving a radio frequency (RF) signal at the OFDM receiver, which has a fast Fourier transform (FFT) stage, and storing a first output of the FFT stage in a memory. The first output corresponds to the RF signal at a first time. The method further includes convolving the first output with a second output of the FFT stage, where the second output corresponding to the RF signal at a second time. Additionally, the method includes determining one or more observables of the convolution; and estimating a speed based on the one or more observables.

An example OFDM receiver, according to the disclosure, includes an antenna configured to receive a radio frequency (RF) signal, and a fast Fourier transform (FFT) module configured to provide a first output corresponding to the RF signal at a first time, and a second output corresponding to the RF signal at a second time. The OFDM receiver further comprises a memory coupled with the FFT module and configured to store the first output, a convolution module, coupled with the FFT module and the memory, configured to convolve the first output and the second output, and a speed estimation module configured to determine one or more observables of the convolution of the first output and the second output and estimate a speed based on one or more observables.

An example device, according to the disclosure, includes means for receiving a radio frequency (RF) signal at an OFDM receiver where the OFDM receiver has a fast Fourier transform (FFT) stage, and means for storing a first output of the FFT stage, where the first output corresponds to the RF signal at a first time. The example device further includes means for convolving the first output with a second output of the FFT stage, where the second output corresponds to the RF signal at a second time. The example device also includes means for determining one or more observables of the convolution; and means for estimating a speed based on the one or more observables.

An example non-transitory machine-readable storage medium, according to the dislcosure, comprises instructions that, when executed by a processor, perform functions including: receiving a radio frequency (RF) signal at an OFDM receiver, where the OFDM receiver has a fast Fourier transform (FFT) stage, and storing a first output of the FFT stage where the first output corresponds to the RF signal at a first time. The example non-transitory machine-readable storage medium further includes insrtuctions for convolving the first output with a second output of the FFT stage, where the second output corresponding to the RF signal at a second time, and instructions for determining one or more observables of the convolution and estimating a speed based on the one or more observables.

Items and/or techniques described herein may provide one or more of the following capabilities, as well as other capabilities not mentioned. Because the techniques disclosed re-use results from intermediate processing states in typical OFDM receivers, and because of the very small computational and memory requirements involved, techniques disclosed herein may be utilized in existing OFDM receivers with little or no additional hardware. These and other embodiments, along with many of its advantages and features, are described in more detail in conjunction with the text below and attached figures.

BRIEF DESCRIPTION OF THE DRAWINGS

A further understanding of the nature and advantages of various embodiments may be realized by reference to the following figures. In the appended figures, similar components or features may have the same reference label.

DETAILED DESCRIPTION

Figure 1:
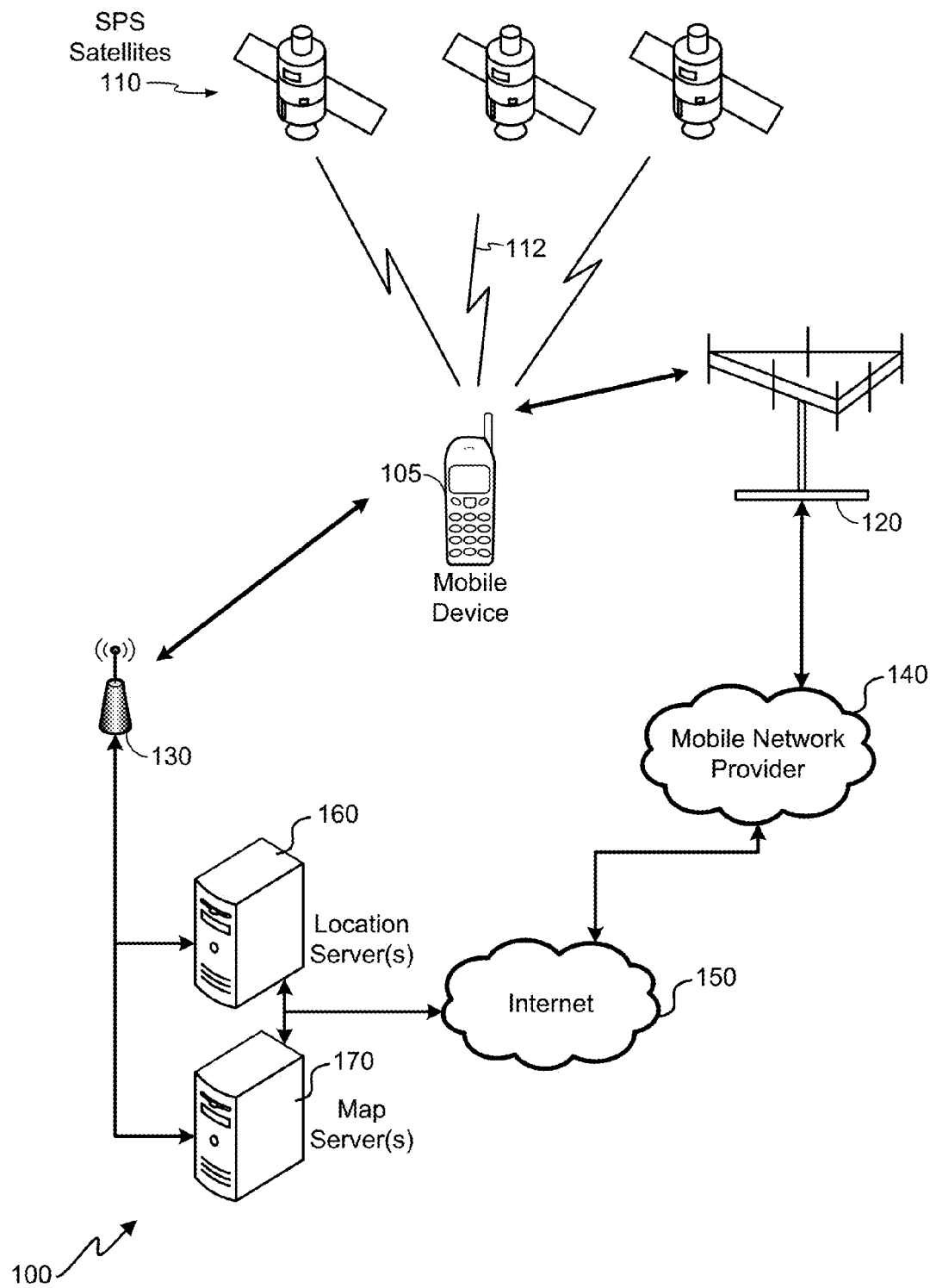
FIG. 1 is an illustration of an example positioning system in which embodiments of the speed estimation techniques disclosed herein by be utilized.

The following description is provided with reference to the drawings, where like reference numerals are used to refer to like elements throughout. While various details of one or more techniques are described herein, other techniques are also possible. In some instances, structures and devices are shown in block diagram form in order to facilitate describing various techniques.

Mobile devices, such as mobile phones, radios, personal electronics, automotive electronics, and/or other devices, can provide a wide range of functionality. Many devices are configured to execute software applications involving positioning, navigation, and the like. Accordingly, mobile devices can utilize a wide variety of data inputs—internal and/or external to the mobile device—to help ensure the accuracy of these applications.

FIG. 1, for example, is a simplified illustration of a positioning system 100 in which a mobile device 105 and/or other components of the positioning system 100 can process various data points to determine the position of the mobile device 105. Such data points can include speed estimates using the techniques described herein below. The positioning system can include a mobile device 105, satellite positioning service (SPS) satellites 110, base transceiver station(s) 120, mobile network provider 140, access point(s) 130, location server(s) 160, map server(s) 170, and the Internet 150. It should be noted that FIG. 1 provides only a generalized illustration of various components, any or all of which may be utilized as appropriate. A person of ordinary skill in the art will recognize many modifications to the components illustrated. Furthermore, the positioning system 100 illustrated in FIG. 1 is provided as an example system in which speed estimation techniques provided herein can be used. However, embodiments are not so limited. As mentioned previously, speed estimation can be utilizes in a variety of devices other than the mobile device 105 of FIG. 1, and for a variety of applications other than positioning.

In the positioning system 100, a location of the mobile device 105 can be determined using a variety of information. For example, the location of the mobile device 105 can be calculated using triangulation and/or other positioning techniques with information transmitted from SPS satellites 110. In these embodiments, the mobile device 105 may utilize a receiver specifically implemented for use with the SPS that extracts position data from a plurality of signals 112 transmitted by SPS satellites 110. The SPS satellites 110 can form part of a Global Positioning System (GPS), Global Navigation Satellite System (GNSS), and/or other satellite navigation system.

Additionally or alternatively, the mobile device can communicate with base transceiver stations 120 and mobile network provider 140 (e.g., a cell phone service provider), as well as access point(s) 130 to help determine the mobile device's position. Such communication can be provided by an Orthogonal Frequency Division Multiple Access (OFDMA) or other network, which can implement, for example, Long Term Evolution (LTE), LTE Advanced, and the like. Positioning can be determined via triangulation, proximity, and/or other techniques, which may complement and/or facilitate SPS-based position determinations. Furthermore, the mobile network provider 140 and/or access point(s) 130 can further communicatively connect the mobile device 105 to the Internet 150, location server(s) 160, and/or map server(s) 170, which can collect data from the mobile device 105 and other sources to assist in location determination.

In addition to the various components of the positioning system 100 illustrated in FIG. 1, the mobile device 105 can utilize data from internal components to assist in position determination. For example, the mobile device 105 can include a variety of sensors, such as gyroscopes, accelerometers, magnetometers, and others. Such sensors can provide useful information utilized in dead reckoning calculations to complement and/or further improve the accuracy of location determinations. In addition to these internal sensors, a mobile device may be further configured to utilize an internal OFDM modulation scheme to determine the mobile device's absolute speed, which can aid in position determination (and other applications). OFDM speed estimation and data from internal sensors can be particularly beneficial when the SPS receiver of the mobile device 105 is unable to receive sufficient information from SPS satellites for a position determination, such as in indoor environments.

Figure 2A:
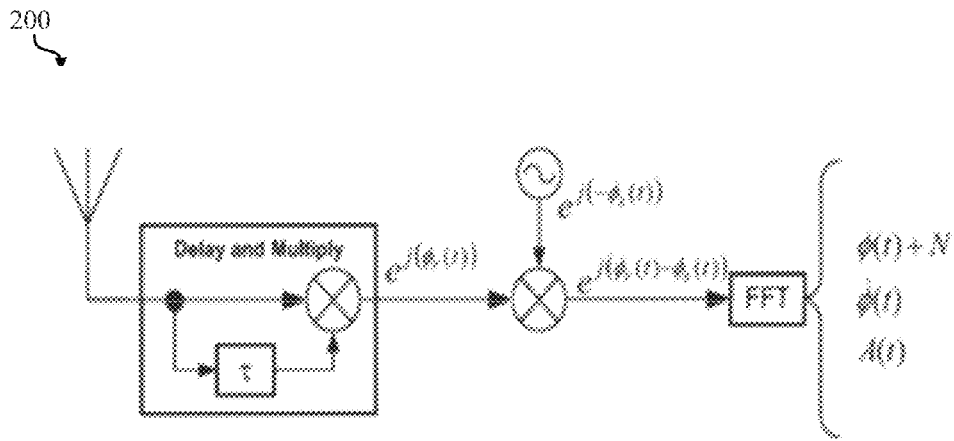
FIG. 2A is a block diagram of a sensor for performing speed calculations conducted in the time domain using delay and multiply operations (or other non-linear operations) followed by a Fourier transform.
Figure 2B:
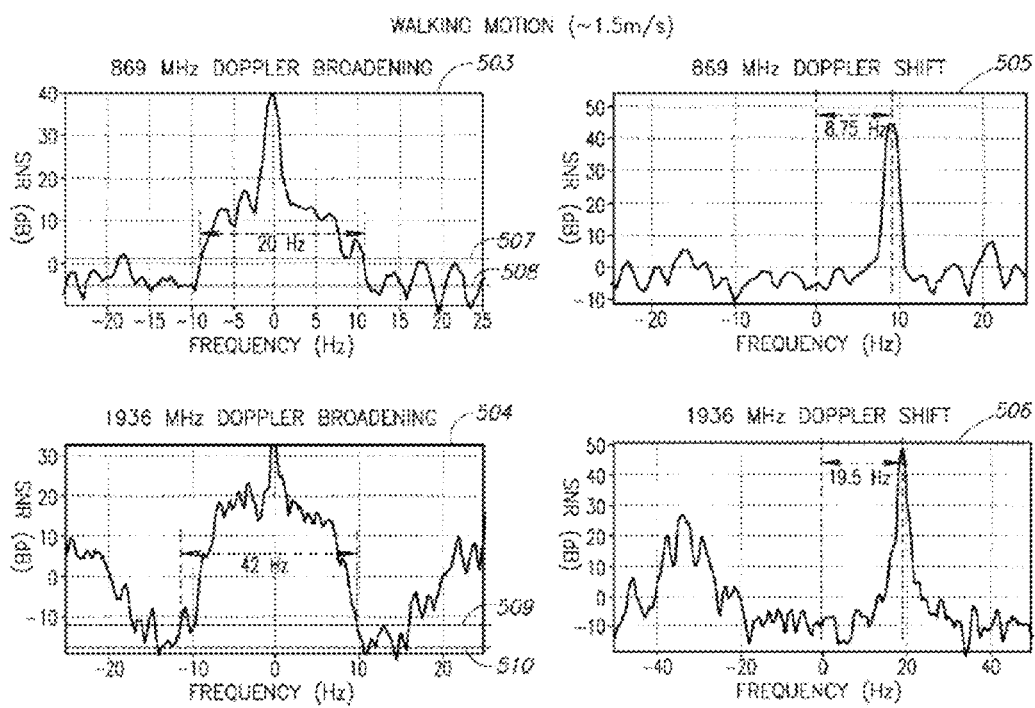
FIG. 2B shows graphs of the resulting frequency spectrum after operations performed by the sensor of FIG. 2A.

Various techniques have been developed for speed estimation in OFDM-based communication systems. In one current technique, the so-called Spectral Compression Sensing (SCP), speed estimation is performed using time domain techniques. Baseband RF sample data is passed through delay and multiply operations (or other non-linear operations) followed by a Fourier transform. FIG. 2A is a block diagram of a receiver 200 for performing such a process. FIG. 2B shows graphs of the resulting frequency spectrum after these operations, as illustrated in U.S. Patent Application No. 2012/0086606 entitled "Doppler Aided Inertial Navigation," which is incorporated by reference herein. Here, the receiver 200 acts upon an intercepted broadband signal to produce a set of observables suitable for estimating sensor physical state.

Put briefly, for non-multipath environments, the SCP approach directly estimates the Doppler frequency shift of spectrum peak relative to the nominal carrier frequency. This shift can be estimated using known peak detection methods. For complex multipath environments, the Doppler frequency shift is a function of the width of the peak in the Fourier spectrum produced by the delay and multiply operations. This is called Doppler Broadening. The maximum width of the peak is a measurement of the maximum speed between an emitter and an interceptor. The technique used to determine the peak broadening width for graphs 503 and 504 involves the determination of the average noise floor, lines 508 and 510, around the broadened peak and then setting an appropriate threshold. Heuristics or more rigorous (i.e., statistical) methods could be used to this end. To obtain the speed of the device given the Doppler broadening width is accomplished by the following equation.

$$v = \frac{c}{4 * f_{carrier}} * \Delta f_{width} \tag{1}$$

$f_{carrier}$ is the carrier frequency, $\Delta f_{width}$ is the width of the peak broadening, and c is the speed of light.

Alternative embodiments for determining velocity using Doppler broadening are contemplated in the SCP approach. Aspects of the shape of the broadened peak, in addition to the width, could be incorporated into more complex and accurate measurement methods that could, for instance, adapt to changes in the multipath environment.

The physics behind the Doppler broadening effect can be briefly described as follows. In typical indoor environments and in some outdoor contexts, an RF receiver may receive (broadcast) RF energy via reflections from a large number of scatterers. When the RF receiver moves, it will receive RF energy from these scatterers but with phases (and phase rates) that will be a function for the relative speed and angle between the RF receiver and each of the scatterers. In the presence of a large number of scatterers, the delay and multiply operations result in quite complex intermodulation products and thus an intricate spectrum as well. However, the width of the spectrum of these intermodulation products is a direct function of the RF receiver's speed (e.g., a lower bound on the speed). As indicated above, various heuristics or more rigorous methods can be used to measure this intermodulation spectrum width and/or other observables, and thus the RF receiver's speed.

These techniques, however, can be difficult to implement in certain communication systems due to the computational and memory requirements associated with determining the spectrum of intermodulation products using time-domain operations. With this in mind, embodiments of the present invention utilize frequency-domain operations to enable OFDM receivers to determine the width and/or other observables of intermodulation products (and thus, the OFDM receivers' speeds). Moreover, these operations can be carried out using existing OFDM receiver components.

Figure 3:
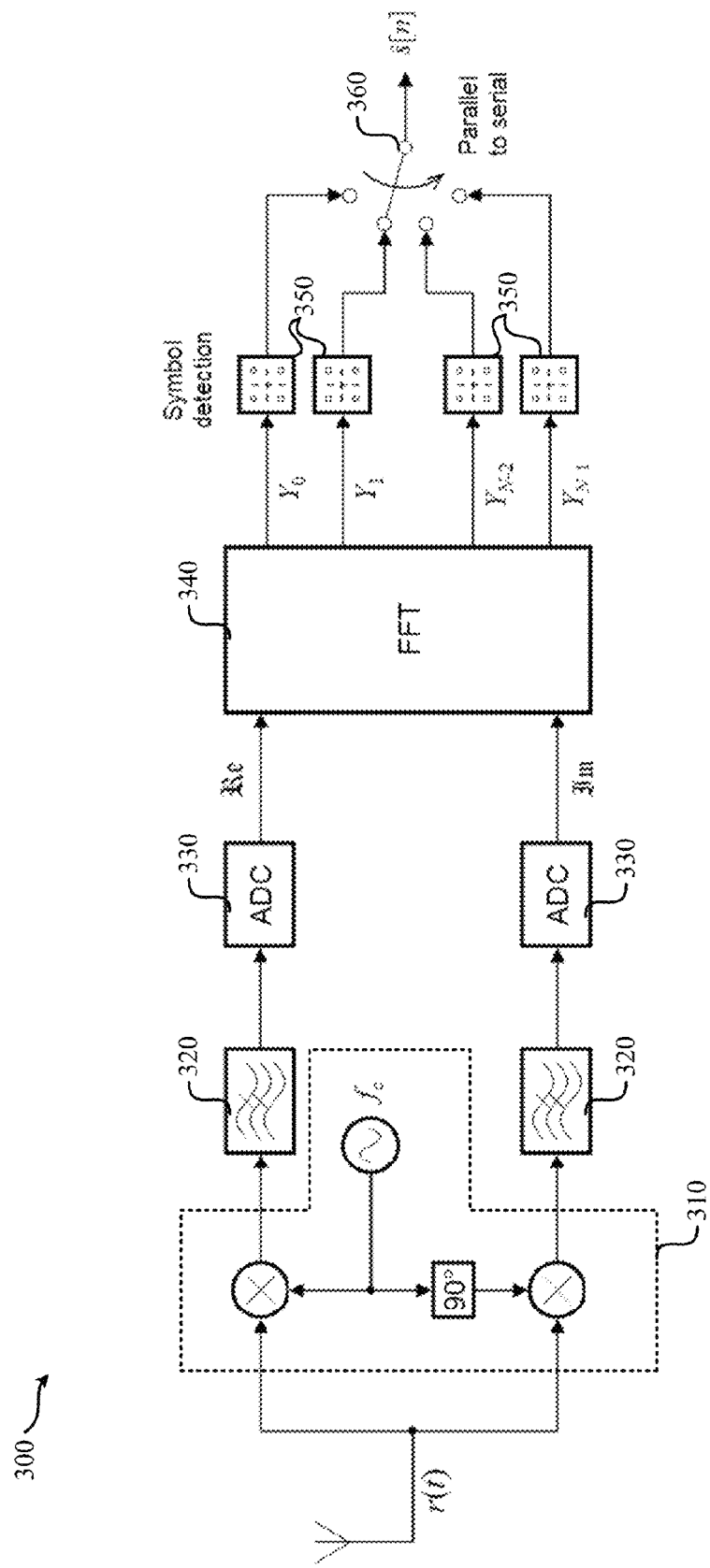
FIG. 3 is a block diagram of an embodiment of an orthogonal frequency-division multiplexing (OFDM) receiver capable of performing speed calculations conducted in the frequency domain according to the techniques provided herein.

FIG. 3 is a block diagram of a generic OFDM receiver 300, according to one embodiment. It will be appreciated that the OFDM receiver 300 shown is merely a non-limiting example providing a generalized illustration of various components, any or all of which may be utilized as appropriate. Other embodiments may add, omit, and/or combine components based on desired functionality. For example, Fast Fourier Transform (FFT) module 340 can be separated into real and imaginary subcomponents and/or split into multiple stages, depending on the implementation. Furthermore, components for synchronization may be included in some embodiments. Moreover, components of the OFDM receiver 300 can be implemented in hardware and/or software, such as hardware and/or software components of the mobile device illustrated in FIG. 5. A person having ordinary skill in the art will recognize many alterations.

Embodiments provided herein can be utilized in any of a variety of OFDM applications. This includes, for example, recent generations of Wi-Fi® (IEEE 802.11) (such as is used in a Local Area Network (LAN)), as well as Orthogonal Frequency-Division Multiple Access (OFDMA), which is utilized in cellular (e.g., Long Term Evolution (LTE)) (as indicated in regard to FIG. 1) and non-cellular communications, such as broadcast OFDM networks (e.g., certain Digital Television (DTV) standards, such as Digital Video Broadcasting-Terrestrial (DVB-T)), among others. A person having ordinary skill in the art will recognize various applications beyond those described explicitly herein.

The OFDM receiver 300 is configured to receive an input RF signal, r(t), and provide an output bit stream, ŝ[n]. The input RF signal, r(t), is provided to a down converter 310, which down-converts the signal to baseband using sine and cosine waves at the carrier frequency, $f_c$. Band-pass filters 320 are utilized to remove unwanted high-frequency signals (e.g., signals centered on $3f_c$ created during down conversion). Analog-to-digital converters (ADCs) 330 are used to sample the down-converted signals to produce the I/Q samples of the received signal. These I/Q samples are then provided to an FFT module 340 (or FFT stage), which provides a spectrum of N parallel outputs (e.g., $Y_0, Y_1, \ldots, Y_2,$ and $Y_{N-1}$). The FFT module's outputs are then converted to binary streams utilizing symbol detection module 350 and joined into a serial output bit stream, ŝ[n], utilizing a parallel-to-serial module 360.

As long as the OFDM receiver 300 is on, the FFT module 340 can provide a continuous stream of outputs. Thus, rather than attempting to extract information about speed of the OFDM receiver 300 via time-domain processing (e.g., delay and multiply) of the I/Q samples coming out of the ADCs 330, embodiments provide for using the outputs of the FFT module 340 to extract information about speed using frequency-domain processing.

From the Convolution Theorem, multiplication in the time domain is the same as convolution in the frequency domain:

$$\mathcal{F}\{x(t) \cdot x(t-\tau)\} = \mathcal{F}\{x(t)\} * \mathcal{F}\{x(t-\tau)\} \quad (2)$$

where F is a Fourier transform, and x is the signal as a function of time t and delay time τ. Thus, for an output, Y(t), of the FFT module 340 at time t:

$$\mathcal{F}\{x(t)\} \Leftrightarrow Y(t) \quad (3)$$

and $$\mathcal{F}\{x(t-\tau)\} \Leftrightarrow Y(t-\tau) \quad (4)$$

Therefore, the OFDM receiver 300 can be utilized to extract observables for speed estimations by simply convolving an existing output, Y(t), with a time-delayed output, Y(t−τ).

In some embodiments, a memory, such as a First In, First Out (FIFO) buffer, can be coupled with the output of the FFT module 340 and/or the parallel-to-serial module 360, to provide the time-delayed output, Y(t−τ), for convolution. The size of the memory can vary, depending on desired functionality, to provide the time delay τ. For example, in some embodiments, time delay τ can be from approximately 10 to 100 nanoseconds. In some embodiments, time delay τ can be from approximately 100 to 1000 nanoseconds. Yet other embodiments may include delay times of greater than 1000 nanoseconds and/or less than 10 nanoseconds, depending on desired functionality and/or other factors.

As indicated in equation (2), the convolution of output, Y(t), with a time-delayed output, Y(t−τ), yields the same result as a delay-and-multiply operation on corresponding time-domain signals. Thus, observables of the convolution (and, consequently, the speed of the OFDM receiver 300) can be determined utilizing the same or similar heuristics or more rigorous statistical/analytical methods used in traditional methods, such as those described in above.

In practical applications, observables such as the width of the convolution can provide a reliable indication of movement and speed. For example, if Y(t) and Y(t−τ), are the same (ignoring differences caused by noise), then the convolution will result in a spectrum having a peak at 0 having no width, and therefore indicating no movement. When the OFDM receiver 300 begins to move, and as the speed gets faster and faster, differences between Y(t) and Y(t−τ) will become more pronounced. In such a case, differences in spectrum between Y(t) and Y(t−τ) will cause the peak of the resulting convolution to "spread," indicating a finite width (and corresponding movement/speed). Again, because the convolution is the same as the multiplication result from traditional time-domain operations, convolution width and corresponding speed can be determined using conventional methods. Some embodiments can provide accurate speed estimates for speeds of up to 10 m/s. Other embodiments can provide estimates for speeds greater than 10 m/s, depending on desired functionality.

Figure 4:
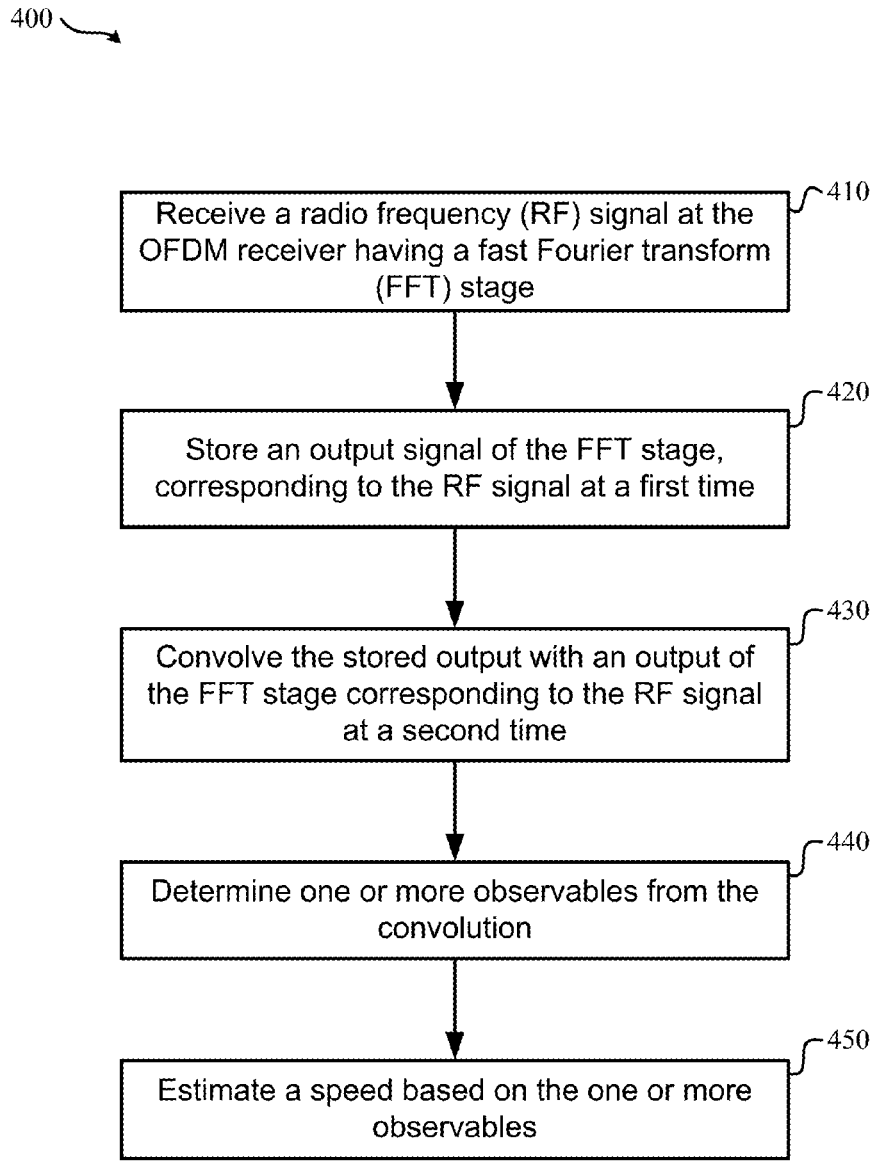
FIG. 4 is a flowchart illustrating an embodiment of a method for estimating speed using an OFDM receiver.

FIG. 4 is a flowchart illustrating an embodiment of a method 400 for estimating speed using an OFDM receiver. The blocks detailed in FIG. 4 can be performed hardware, software, and/or other signal processing means of a mobile device. Moreover, functionality can be functionally and/or physically divided into separate components, such as those shown in FIG. 2. The method 400 can be utilized in essentially any OFDM receiver, including OFDM receivers found in mobile telephones and other portable electronic devices, such as the mobile device described below in relation to FIG. 5.

The method can start at block 410, where an RF signal is received at the OFDM receiver having an FFT stage. As indicated above, the FFT stage can comprise one or more FFT modules producing one or more outputs. Parallel output signals can be combined into a single bit stream, depending on desired functionality. Means for providing the functionality described in block 410 can include, an antenna, input circuitry, and the like.

At block 420 an output signal of the FFT stage, corresponding to the RF signal at a first time, is stored. Means for storing the output signal can include a memory such as, for example, a FIFO buffer capable of providing a desired delay time $\tau$. The memory can be physically located, for example, in the cache of a processing unit and/or in a separate memory module. Means for providing the functionality described in block 420 can include, in addition to the memory, hardware and/or software components communicatively coupled with the FFT state and memory.

At block 430, the stored output is convolved with an output of the FFT stage corresponding to the RF signal at a second time. As discussed above, the resulting convolution is a spectrum having width and/or other observables, such as Doppler shift and amplitude, which can be indicative a speed of the OFDM receiver. The one or more of these observables is determined from the convolution at block 440, by, for example, determining a width of the convolution, an area under the convolution (or its equivalent), an amplitude of the convolution, or the like, depending on the observable(s) to be utilized in speed determination. A speed is then estimated based on the one or more observables of the convolution, at block 450. Means for performing the convolution, determination of observables, and/or speed estimation can include software and/or hardware components in, for example, communicatively coupled with the FFT state and memory. Such components can include one or more dedicated modules of the OFDM receiver. For example, a convolution module can perform the convolution, while a speed estimation module determines the width of the convolution and/or estimates the speed based on the determined width. Additionally or alternatively, these steps can be executed by a single physical and/or virtual processing unit.

Because the resulting convolution provides the same spectrum as the Fourier transform of delay and multiply techniques, the width of the convolution (and subsequent speed estimation) can be determined using the same heuristics or more rigorous mathematical methods as in these other techniques.

It should be appreciated that the specific steps illustrated in FIG. 4 provide an example of a method 400 for estimating speed using an OFDM receiver. Alternative embodiments may include alterations to the embodiments shown. Furthermore, features may be added or removed depending on the particular applications. One of ordinary skill in the art would recognize many variations, modifications, and alternatives.

It should also be appreciated that techniques provided herein can be utilized in virtually any type of OFDM receiver. Furthermore, OFDM receivers, such as the OFDM receiver depicted in FIG. 3, can be implemented in any of a variety of ways, depending on manufacturing concerns, desired functionality, and other factors.

OFDM receivers can comprise one or more software and/or hardware elements that can be electrically coupled or may otherwise be in communication, as appropriate. The hardware elements may include one or more as processor(s), which can include without limitation one or more general-purpose processors, one or more special-purpose processors, and/or other processing means, which can be utilized to perform at least a portion OFDM speed estimation techniques described herein. Hardware elements may also include antenna(s), synchronization circuitry, and/or the like. Example hardware elements are provided in regards to FIG. 5.

Figure 5:
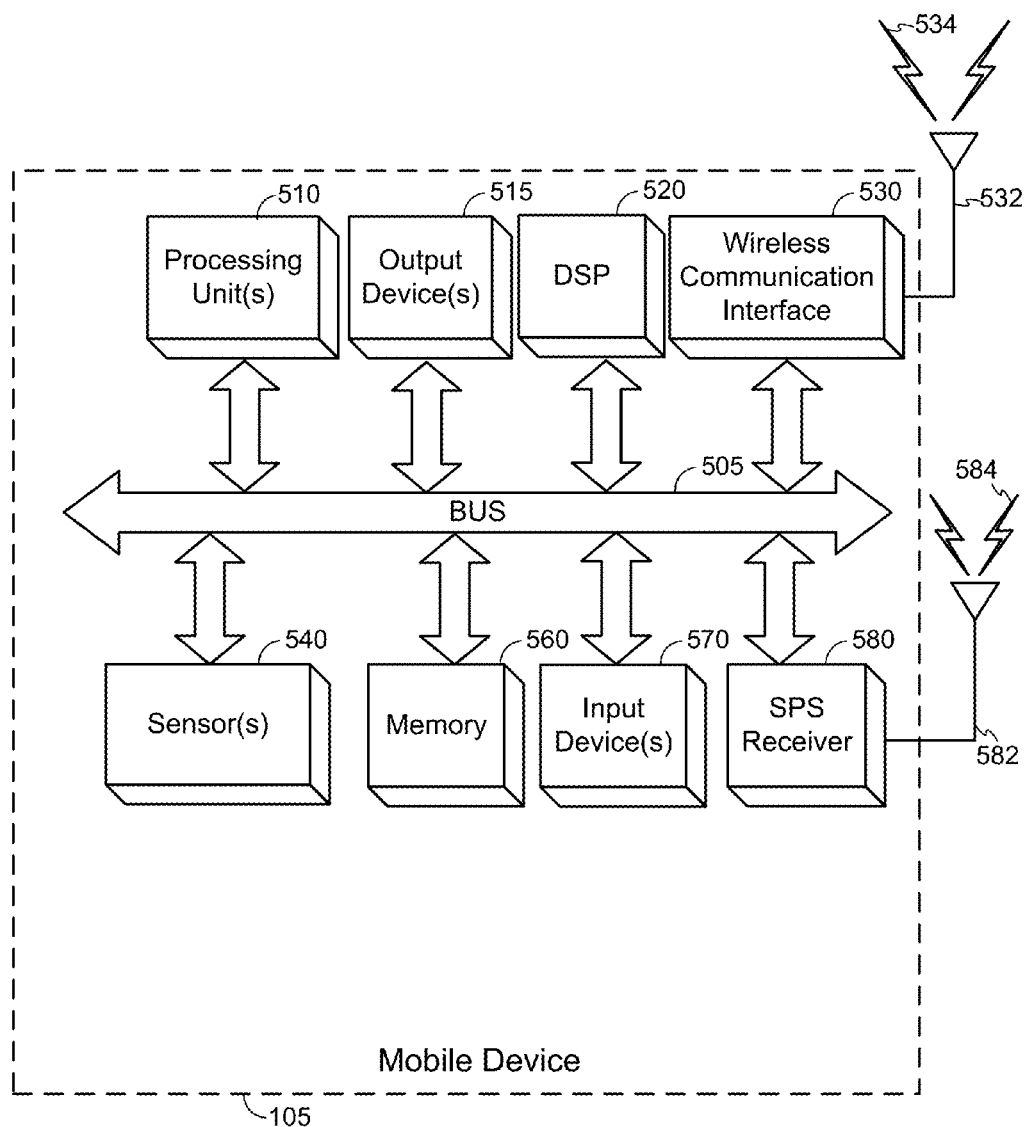
FIG. 5 is a block diagram of an embodiment of a mobile device, which can implement the OFDM receiver of FIG. 3 and/or method for estimating speed of FIG. 4.

FIG. 5 illustrates an embodiment of a mobile device 105, which can implement the OFDM speed estimation techniques discussed herein, such as the method 400 shown in FIG. 4. Furthermore, the mobile device may be utilized in a positioning system, such as the positioning system 100 of FIG. 1. It should be noted that FIG. 5 is meant only to provide a generalized illustration of various components, any or all of which may be utilized as appropriate. Moreover, system elements may be implemented in a relatively separated or relatively more integrated manner. One or more of the software and/or hardware components shown of the mobile device 105 can implement the various components of the OFDM receiver 300 of FIG. 3.

The mobile device 105 is shown comprising hardware elements that can be electrically coupled via a bus 505 (or may otherwise be in communication, as appropriate). The hardware elements may include a processing unit(s) 510 which can include without limitation one or more general-purpose processors, one or more special-purpose processors (such as digital signal processors (DSPs), graphics acceleration processors, application specific integrated circuits (ASICs), and/or the like), and/or other processing structure or means, which can be configured to perform one or more of the methods described herein, including method illustrated in FIG. 4. As shown in FIG. 5, some embodiments may have a separate DSP 520, depending on desired functionality. The mobile device 105 also can include one or more input devices 570, which can include without limitation a touch screen, a touch pad, microphone, button(s), dial(s), switch(es), and/or the like; and one or more output devices 515, which can include without limitation a display, light emitting diode (LED), speakers, and/or the like.

The mobile device 105 might also include a wireless communication interface 530, which can include without limitation a modem, a network card, an infrared communication device, a wireless communication device, and/or a chipset (such as a Bluetooth™ device, an IEEE 502.11 device, an IEEE 502.15.4 device, a WiFi device, a WiMax device, cellular communication facilities, etc.), and/or the like. The wireless communication interface 530 may permit data to be exchanged with a network, wireless access points, other computer systems, and/or any other electronic devices described herein. The communication can be carried out via one or more wireless communication antenna(s) 532 that send and/or receive wireless signals 534.

Depending on desired functionality, the wireless communication interface 530 can include separate transceivers to communicate with base transceiver stations (e.g., base transceiver stations 120 of a cellular network) and access points (e.g., access point(s) 130 of FIG. 1). These different data networks can include, an OFDMA and/or other type of network.

The mobile device 105 can further include sensor(s) 540. Such sensors can include, without limitation, one or more accelerometer(s), gyroscope(s), camera(s), magnetometer(s), altimeter(s), microphone(s), proximity sensor(s), light sensor(s), and the like. Some or all of the sensor(s) 540 can be utilized, among other things, for dead reckoning calculations to complement and/or further improve the accuracy of speed, velocity, and location determinations. However, techniques for speed estimation provided herein can utilize mobile devices with no sensor(s) 540 or other specialized components for location detection.

Embodiments of the mobile device may also include a Satellite Positioning System (SPS) receiver 580 capable of receiving signals 584 from one or more SPS satellites using an SPS antenna 582, as described above in relation to FIG. 1. Such positioning can be utilized to complement and/or incorporate the techniques described herein. It can be noted that, as used herein, an SPS may include any combination of one or more global and/or regional navigation satellite systems and/or augmentation systems, and SPS signals may include SPS, SPS-like, and/or other signals associated with such one or more SPS.

The mobile device 105 may further include and/or be in communication with a memory 560. The memory 560 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data structures, such as the FIFO and/or other memory utilized by the techniques described herein, and may be allocated by hardware and/or software elements of an OFDM receiver. Additionally or alternatively, data structures described herein can be implemented by a cache or other local memory of a DSP 520 or processing unit(s) 510.

The memory 560 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 4, might be implemented as code and/or instructions executable by the mobile device 105 (and/or a processing unit within a mobile device 105) and/or stored on a non-transitory and/or machine-readable storage medium (e.g., a "computer-readable storage medium," a "process-readable storage medium, etc.). In an aspect, then, such code and/or instructions can be used to configure and/or adapt a general purpose processor (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for estimating speed using an orthogonal frequency division multiplexing (OFDM) receiver, the method comprising:
    receiving a radio frequency (RF) signal at the OFDM receiver, the OFDM receiver having a fast Fourier transform (FFT) stage;
    storing a first output of the FFT stage in a memory, the first output corresponding to the RF signal at a first time;
    convolving the first output with a second output of the FFT stage, the second output corresponding to the RF signal at a second time;
    determining one or more observables of the convolution; and
    estimating a speed based on the one or more observables.

2. The method of claim 1, wherein the memory comprises a First In, First Out (FIFO) buffer.

3. The method of claim 1, wherein one or more observables includes at least one of:
    a width,
    a Doppler shift, or
    an amplitude.

4. The method of claim 1, wherein estimating the speed includes using heuristics.

5. The method of claim 1, wherein estimating the speed includes performing a mathematical analysis of the one or more observables.

6. The method of claim 1, wherein the RF signal is received from at least one of:
    a cellular network,
    a broadcast OFDM network, or
    a Local Area Network (LAN).

7. An orthogonal frequency division multiplexing (OFDM) receiver comprising:
    an antenna configured to receive a radio frequency (RF) signal;
    a fast Fourier transform (FFT) module configured to provide:
        a first output corresponding to the RF signal at a first time; and
        a second output corresponding to the RF signal at a second time;
    a memory, coupled with the FFT module, configured to store the first output; and
    a convolution module, coupled with the FFT module and the memory, configured to convolve the first output and the second output; and a speed estimation module configured to:
  determine one or more observables of the convolution of the first output and the second output; and
  estimate a speed based on one or more observables.

8. The OFDM receiver of claim 7, wherein the memory comprises a First In, First Out (FIFO) buffer.

9. The OFDM receiver of claim 7, wherein functionality of at least one of the FFT module, the convolution module, or the speed estimation module is provided with a digital signal processor.

10. The OFDM receiver of claim 7, wherein the antenna is configured to receive the RF signal from at least one of:
  a cellular network,
  a broadcast OFDM network, or
  a Local Area Network (LAN).

11. The OFDM receiver of claim 7, wherein the speed estimation module is configured to estimate the speed using heuristics.

12. The OFDM receiver of claim 7, wherein the speed estimation module is configured to estimate the speed with a mathematical analysis of the one or more observables.

13. A device comprising:
  means for receiving a radio frequency (RF) signal at an OFDM receiver, the OFDM receiver having a fast Fourier transform (FFT) stage;
  means for storing a first output of the FFT stage, the first output corresponding to the RF signal at a first time;
  means for convolving the first output with a second output of the FFT stage, the second output corresponding to the RF signal at a second time;
  means for determining one or more observables of the convolution; and
  means for estimating a speed based on the one or more observables.

14. The device of claim 13, wherein the means for storing the first output of the FFT stage comprise a First In, First Out (FIFO) buffer.

15. The device of claim 13, wherein the means for determining the one or more observables include means for determining at least one of:
  a width,
  a Doppler shift, or
  an amplitude.

16. The device of claim 13, wherein the means for estimating the speed include means for estimating the speed using heuristics.

17. The device of claim 13, wherein the means for estimating the speed include means for performing a mathematical analysis of the one or more observables.

18. The device of claim 13, wherein the means for receiving the RF signal include means for receiving the RF signal from at least one of:
  a cellular network,
  a broadcast OFDM network, or
  a Local Area Network (LAN).

19. A non-transitory machine-readable storage medium comprising instructions that, when executed by a processor, perform functions including:
  receiving a radio frequency (RF) signal at an OFDM receiver, the OFDM receiver having a fast Fourier transform (FFT) stage;
  storing a first output of the FFT stage, the first output corresponding to the RF signal at a first time;
  convolving the first output with a second output of the FFT stage, the second output corresponding to the RF signal at a second time;
  determining one or more observables of the convolution; and
  estimating a speed based on the one or more observables.

20. The non-transitory machine-readable storage medium of claim 19, wherein the instructions for storing the first output of the FFT stage comprise instructions for utilizing a First In, First Out (FIFO) buffer.

21. The non-transitory machine-readable storage medium of claim 19, wherein the instructions for determining the one or more observables include instructions for determining at least one of:
  a width,
  a Doppler shift, or
  an amplitude.

22. The non-transitory machine-readable storage medium of claim 19, wherein the instructions for estimating the speed include instructions for estimating the speed using heuristics.

23. The non-transitory machine-readable storage medium of claim 19, wherein the instructions for estimating the speed include instructions for performing a mathematical analysis of the one or more observables.

24. The non-transitory machine-readable storage medium of claim 19, wherein the instructions for receiving the RF signal include instructions for receiving the RF signal from at least one of:
  a cellular network,
  a broadcast OFDM network, or
  a Local Area Network (LAN).

* * * * *